(12) United States Patent
Franklin

(10) Patent No.: US 11,958,282 B2
(45) Date of Patent: Apr. 16, 2024

(54) BREATHABLE FILMS HAVING INCREASED HYDROSTATIC HEAD PRESSURE

(71) Applicant: CLOPAY PLASTIC PRODUCTS COMPANY, INC., Mason, OH (US)

(72) Inventor: Toriano A. Franklin, Maineville, OH (US)

(73) Assignee: BERRY FILM PRODUCTS COMPANY, INC., Evansville, IN (US)

( * ) Notice: Subject to any disclaimer, the term of this patent is extended or adjusted under 35 U.S.C. 154(b) by 507 days.

(21) Appl. No.: 15/809,323

(22) Filed: Nov. 10, 2017

(65) Prior Publication Data

US 2018/0141304 A1 May 24, 2018

Related U.S. Application Data

(60) Provisional application No. 62/424,034, filed on Nov. 18, 2016.

(51) Int. Cl.
*B32B 5/18* (2006.01)
*B29C 48/00* (2019.01)
(Continued)

(52) U.S. Cl.
CPC .............. *B32B 5/18* (2013.01); *B29C 48/022* (2019.02); *B29C 48/08* (2019.02); *B29C 48/10* (2019.02); *B29D 7/01* (2013.01); *B32B 7/12* (2013.01); *B29C 48/0018* (2019.02); *B29C 48/21* (2019.02); *B29K 2023/06* (2013.01); *B29K 2023/12* (2013.01); *B29K 2105/041* (2013.01); *B29K 2105/16* (2013.01); *B29K 2509/02* (2013.01); *B29K 2995/0065* (2013.01); *B29K 2995/0077* (2013.01); *B29K 2995/0089* (2013.01); *B29L 2007/008* (2013.01); *B29L 2009/00* (2013.01); *B32B 37/04* (2013.01);
(Continued)

(58) Field of Classification Search
None
See application file for complete search history.

(56) References Cited

U.S. PATENT DOCUMENTS 5,422,172 A 6/1995 Wu
6,071,450 A 6/2000 Topolkaraev
(Continued)

FOREIGN PATENT DOCUMENTS

| EP | 1560710 A1 | 8/2005 | |
|----|----|----|----|
| WO | 2004043693 A1 | 5/2004 | |
| WO | WO-2007081548 A2 * | 7/2007 | ........... B29C 55/023 |

OTHER PUBLICATIONS

PCT, International Search Report and Written Opinion of the International Searching Authority, International Application No. PCT/US2017/061042, 8 pages, dated Jan. 25, 2018.
(Continued)

*Primary Examiner* — Alicia Chevalier
*Assistant Examiner* — Elaine M Vazquez
(74) *Attorney, Agent, or Firm* — Barnes & Thornburg LLP

(57) ABSTRACT

Microporous films comprising a polymeric composition and a filler, wherein the film has an average water vapor transmission rate of at least about 16,000 grams $H_2O$/24-hour/$m^2$, a hydrostatic head pressure of at least about 300 mbar, and a basis weight of from about 5 gsm to about 50 gsm.

20 Claims, 3 Drawing Sheets

(51) Int. Cl.
    *B29C 48/08*      (2019.01)
    *B29C 48/10*      (2019.01)
    *B29D 7/01*      (2006.01)
    *B32B 7/12*      (2006.01)
    *B29C 48/21*      (2019.01)
    *B29K 23/00*      (2006.01)
    *B29K 105/04*      (2006.01)
    *B29K 105/16*      (2006.01)
    *B29K 509/02*      (2006.01)
    *B29L 7/00*      (2006.01)
    *B29L 9/00*      (2006.01)
    *B32B 37/04*      (2006.01)
    *B32B 37/12*      (2006.01)
    *B32B 37/18*      (2006.01)

(52) U.S. Cl.
    CPC ............ *B32B 37/12* (2013.01); *B32B 37/182* (2013.01); *B32B 2264/107* (2013.01); *B32B 2266/025* (2013.01); *B32B 2555/00* (2013.01)

(56) References Cited

U.S. PATENT DOCUMENTS

| | | | |
|---|---|---|---|
| 6,623,837 | B2 | 9/2003 | Morman |
| 6,982,231 | B1 | 1/2006 | Uitenbroek et al. |
| 7,442,332 | B2 | 10/2008 | Cancio et al. |
| 7,510,758 | B2 | 3/2009 | Thomas |
| 9,492,332 | B2 | 11/2016 | Cancio et al. |
| 2003/0106560 | A1 | 6/2003 | Griesbach |
| 2004/0053010 | A1* | 3/2004 | Morman ............... A61F 13/537 |
| | | | 428/179 |
| 2010/0159203 | A1* | 6/2010 | Shi ......... A61L 15/225 |
| | | | 428/159 |
| 2010/0215933 | A1 | 8/2010 | Fiscus et al. |
| 2015/0328058 | A1 | 11/2015 | Cancio et al. |
| 2015/0360449 | A1* | 12/2015 | Larios ...................... B32B 7/04 |
| | | | 428/213 |
| 2016/0114071 | A1* | 4/2016 | Topolkaraev ....... C08L 23/0884 |
| | | | 604/370 |

OTHER PUBLICATIONS

Extended European Search Report for European App. No. 17871441.6 dated Apr. 20, 2020, CLP-16002 EP II, 11 pages.
Extended European Search Report for European App. No. 17871441.6 dated Apr. 13, 2021, CLP-16002 EP II, 5 pages.
Brazilian Preliminary Examination Report for Brazilian Patent App. No. BR112019010050.4 dated Aug. 13, 2021, CLP-16002 BR II, 4 pages.
Australian Full Examination Report for Australian App. No. 2017360915 dated Jun. 10, 2021, CLP-16002 AU II, 4 pages.
Brazilian Unfavorable Technical Opinion for Brazlian Patent App. No. BR112109010050 dated Sep. 5, 2022, CLP-16002 BR II, 4 pages.

* cited by examiner

BREATHABLE FILMS HAVING INCREASED HYDROSTATIC HEAD PRESSURE

RELATED APPLICATION DATA

This application claims the benefit of U.S. Provisional Application No. 62/464,034, filed Nov. 18, 2016 and incorporated herein by reference in its entirety.

FIELD OF THE INVENTION

The present application relates to polymeric films that exhibit both high breathability and high hydrostatic head pressure. The present invention further relates to laminates and articles, such as absorbent personal hygiene articles, comprising the films.

BACKGROUND OF THE INVENTION

Breathable thermoplastic films allow passage of water vapor through the film while resisting passage of fluids. This is desirable, for example, in absorbent personal hygiene products, because bodily fluids are retained while moisture is allowed to evaporate. This results in a drier, cooler, and more comfortable fit.

Highly breathable films are known in the art, and may be produced by stretching a polymeric film comprising a particulate filler to form voids, or micropores. Breathability may be controlled by factors such as the degree and direction of the stretch, and the type and size of the particulates. However, as breathability is increased, for example by increasing the number or size of pores, so too is the likelihood that liquids pass through the film. This, in turn, results in undesirable leakage. In addition, increasing the number of pores to enhance breathability may result in decreased tear strength and tensile strength, as well as other undesirable physical characteristics.

A need exists, therefore, for polymeric films suitable for use, for example, as an outer cover for disposable hygiene products, which exhibit both high breathability and minimal leakage of fluids, as well as good physical properties.

SUMMARY OF THE INVENTION

The present invention meets the aforementioned need by providing thermoplastic films having an average WVTR of at least 16,000 g $H_2O$/24 hours/$m^2$ and a hydrostatic head pressure ("hydro head pressure") of at least about 300 mbar. The films have a basis weight of from about 5 to about 50 gsm.

The films may be made with an apparatus similar to that disclosed in U.S. Pat. No. 9,492,332, Cancio et al., and depicted in FIG. 3. It has been found, however, that with modification of the processing parameters described in Cancio et al., films can be produced that not only exhibit higher breathability than had previously been achieved, but which also have good hydrostatic head pressures (i.e., low passage of fluid). Furthermore, the hydrostatic head pressure tends to increase, as opposed to decrease, with increasing breathability (FIG. 1). This is counter-intuitive to what would be expected in such films. Specifically, in films having a comparable thickness and composition, the hydrostatic head pressure typically decreases as breathability increases (FIG. 2).

In one aspect, a microporous film is provided comprising a polymeric composition and a filler, wherein the film has an average water vapor transmission rate of at least about 16,000 grams $H_2O$/24-hour/$m^2$, a hydrostatic head pressure of at least about 300 mbar, and a basis weight of from about 5 gsm to about 50 gsm.

In another aspect, a microporous film is provided comprising a polymeric composition and a filler, wherein the film has an average water vapor transmission rate of at least about 16,000 grams $H_2O$/24-hour/$m^2$, a hydrostatic head pressure of at least about 300 mbar, and a basis weight of from about 5 gsm to about 50 gsm, and wherein the film has a higher hydrostatic head pressure than a comparative film having a lower water vapor transmission rate.

In yet another aspect, an article is provided, which comprises a microporous film comprising a polymeric composition and a filler, wherein the film has an average water vapor transmission rate of at least about 16,000 grams $H_2O$/24-hour/$m^2$, a hydrostatic head pressure of at least about 300 mbar, and a basis weight of from about 5 gsm to about 50 gsm.

In yet another aspect, a method of making a film is provided, wherein the film has an average water vapor transmission rate of at least about 16,000 grams $H_2O$/24-hour/$m^2$ and a hydrostatic head pressure of at least about 300 mbar, comprising the steps of extruding a molten web comprising a polymeric composition and a filler from an extruder onto a chill roller, said chill roller operating at a peripheral velocity V1 and at a temperature T1, which is below the melting point of the polymeric composition and which cools said web to form a film; advancing the film to a stretching roller downstream from the chill roller, which operates at a peripheral velocity V2, which is greater than or equal to V1, and at a temperature T2, and wherein the space between the chill roller and the stretching roller is less than or equal to about one inch; and advancing the film to a machine direction orientation section and further stretching the film in the machine direction.

In yet another aspect, a film is provided, wherein the film has an unnotched Elmendorf tear strength in the machine direction of at least about 15 g and/or an unnotched Elmendorf tear strength in the cross direction of at least about 100 g, and wherein the film is made by the aforementioned method.

In yet another aspect, the film has a cup crush peak load of at least about 80 gf.

In yet another aspect, the film has a basis weight of from about 18 gsm to about 35 gsm, and/or a cup crush peak load of at least about 400 gf.

In yet another aspect, the film has an impact strength of at least about 40 g.

In yet another aspect, the film has at least one of a machine-direction load at 10% strain of at least about 350 g/in or a cross-direction load at 10% strain of at least about 150 g/in.

In yet another aspect, the film is printed with at least one ink.

In yet another aspect, the film is embossed.

In yet another aspect, the film is bonded to at least one substrate to form a laminate.

In yet another aspect, the film is ultrasonically bonded and/or adhesively bonded to the substrate.

DETAILED DESCRIPTION OF THE INVENTION

Definitions

Figure 1:
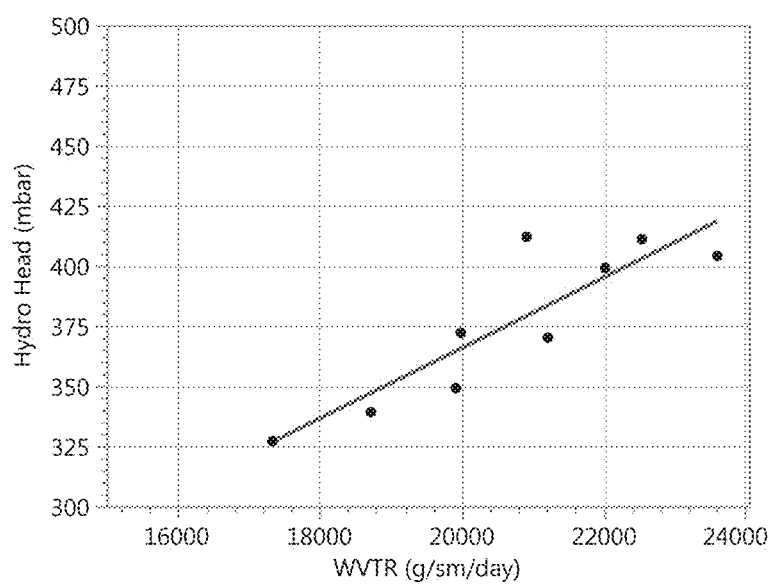
FIG. 1 depicts a graph showing the unexpected relationship of breathability to hydrostatic head pressure as measured in representative films of the present invention. The y-axis shows hydrostatic head pressure in mbar, and the x-axis shows breathability (WVTR) in units of g $H_2O$/24 hours/$m^2$ (g/sm/day).

"Basis weight" means the average weight in grams per unit of area, herein square meters, or gsm, of the film.

"Comparative film" means a second film having substantially the same composition and basis weight as a first film to which it is compared, where "substantially the same" means that any difference is within the margin of error of measurements.

"WVTR" means "water vapor transmission rate," and is a measure of film breathability. WVTR is expressed in units of g $H_2O$/24 hours/$m^2$ or equivalent units thereof, and may be measured according to ASTM method D-6701-01. "Average WVTR" means the average of a number of values for WVTR obtained from testing multiple areas of the same film.

"Hydrostatic head pressure," or "hydrohead pressure," correlates to film leakage and is expressed herein in units of millibar (mbar). In this method, a large (100 $cm^2$) or a small (10 $cm^2$) head may be used, which will influence the pressure, as will the type of solvent being tested. Unless otherwise specified, the term "hydrohead pressure" herein is understood to refer to measurements obtained using the large head. In addition, the hydrohead pressure may be "aqueous hydrohead pressure," which is measured using substantially pure water as the solvent, or "non-aqueous hydrohead pressure," which is measured using either a non-aqueous liquid, or alternatively, a solution comprising water and a water-soluble species (e.g., an ionic compound such as a salt, urea, etc.) as the solvent. Unless otherwise specified, hydrostatic head pressure referred to herein is aqueous hydrohead pressure.

"Cup crush peak load" means maximum amount of force measured in the Cup Crush method WSP 402.0 (09), as described herein. Cup crush peak load is measured in units of gf, wherein "g" means grams and "f" means the force of acceleration due to gravity.

"Tear strength," "tear force," "Elmendorf tear strength," or similar terms, mean the force required to tear a film. Herein, tear strength is expressed in units of grams and is measured by the Elmendorf tear test, ASTM D-1922, incorporated herein by reference, wherein the film is unnotched. It is noted that tear strength is related to film thickness, and for the sake of clarity, any comparison thereof must take into account the relative basis weight of the samples. Tear strength may be specified to be in the cross direction or in the machine direction.

"MD or CD load at 10% strain" means the force required to stretch a film in either the machine-direction or the cross-direction by 10% of its original length, and also may be referred to as "tensile strength." The tensile strength is expressed in units of g/in or equivalent units thereof, and is determined by ASTM method D822-02, using the following parameters: Sample Direction=MD×CD; Sample size=1 inch width×6 inch length; Test speed=20 in/min; Grip distance=2 inch. Grip size=1 inch wide rubber-faced grips, evenly gripping sample.

"Impact strength," or alternatively "F50 impact strength," is expressed in grams and is measured according to the method described in ASTM D1709-15.

Films

The films of the present invention are microporous polymeric films exhibiting both high breathability and low passage of fluids. Microporosity is achieved by stretching a film comprising a suitable filler to create a network of pores. The films are understood not to include apertured films or films which are mechanically perforated.

The films have an average water vapor transmission rate (WVTR) of at least about 16,000 grams $H_2O$/24-hour/$m^2$, of at least about 20,000 grams $H_2O$/24-hour/$m^2$ and alternatively at least about 25,000 grams $H_2O$/24-hour/$m^2$. In one embodiment, the films of the present invention have an average WVTR of from about 16,000 grams $H_2O$/24-hour/$m^2$ to about 30,000 grams $H_2O$/24-hour/$m^2$, and alternatively from about 20,000 grams $H_2O$/24-hour/$m^2$ to about 25,000 grams $H_2O$/24-hour/$m^2$.

The films have a hydrohead pressure of at least about 300 mbar, of at least about 400 mbar, and alternatively of at least about 500 mbar. In one embodiment, the films have a hydrohead pressure of from about 300 mbar to about 750 mbar, and alternatively from about 300 mbar to about 500 mbar.

Examples of suitable solvents with which to measure non-aqueous hydrohead pressure include low surface tension fluids, such as PLURONIC F8 and PLURONIC L121, both available from BASF, Florham Park, NJ, in an amount of 0.5 ml in 500 ml of 0.9% saline solution.

The films may have an unnotched Elmendorf tear strength in the machine direction of at least about 15 g, of at least about 30 g, or of from about 30 g to about 100 g. The films may have an unnotched Elmendorf tear strength in the cross direction of at least about 100 g, of at least about 200 g, or of from about 100 g to about 600 g.

The films may have a machine-direction (MD) load at 10% strain of at least about 350 W/in, of at least about 600 g/in, or of from about 350 g/in to about 1300 g/in, and/or a cross-direction (CD) load at 10% strain of at least about 150 g/in, of at least about 300 g/in, or of from about 150 g/in to about 600 g/in. In one particular embodiment, the films have a basis weight of from about 18 gsm to about 35 gsm, and CD load at 10% strain of at least about 300 g/in. In one particular embodiment, the films have a basis weight of from about 18 gsm to about 35 gsm, and an MD load at 10% strain of at least about 600 g/in. In another particular embodiment, the MD load at 10% strain is within about 20% of the CD load at 10% strain.

The films may have a cup crush peak load of at least about 80 gf, at least about 300 gf, at least about 400 gf, or at least about 500 gf. In one particular embodiment, the films have a basis weight of from about 18 gsm to about 35 gsm, and a cup crush peak load of at least about 400 gf.

The films may have an average basis weight of less than about 50 gsm, less than about 40 gsm, less than about 30 gsm, less than about 20 gsm, or less than about 15 gsm. Alternatively, the films may have an average basis weight of from about 5 gsm to about 50 gsm, from about 5 gsm to about 30 gsm, from about 5 gsm to about 20 gsm, or from about 10 gsm to about 18 gsm. When a film is used as an outer packaging material or other application requiring a thicker film, the average basis weight of the film may be greater than about 50 gsm, for example, from about 50 gsm to about 100 gsm.

The films may be monolayer or multilayer films, examples of which are coextruded multilayer films comprising from about 3 to about 11 layers. "Films," as used herein, are distinguished from laminates in that films are free of layers comprising fibrous components or substrates.

The films of the present invention may be printed on one or both sides. In one embodiment, at least some portions of the film are printed with an ink, and in one embodiment, with a glossy ink and/or a substance that changes (increases or decreases) in volume upon drying to produce a "puckered" appearance in the film's surface. The films may comprise a colorant dispersed throughout the film or distributed on one or more surfaces of the films. The films further may be embossed, optionally to produce a matte or a glossy finish.

The films comprise one or more suitable polymers, fillers and optional processing aids, blended to produce a polymeric composition from which the film is made. For the sake of clarity, the percentages herein refer to both a percentage of the polymeric composition used to make the film, or of the film or film layers, and may be used interchangeably.

Polymers suitable for use in the films include polyolefins, for example, polyethylene, polypropylene, functionalized polyolefins, polyesters, poly(ester-ethers), polyamides, including nylons, poly(ether-amide), polyether sulfones, fluoropolymers, polyurethanes, and mixtures thereof. "Polyethylene" is understood to include polyethylene-based (polyethylenic) polymers and polymeric compositions, including polyethylene homopolymers and copolymers, linear low, low, medium and/or high density polyethylene (LLDPE, LDPE, MDPE, HDPE), polyethylenic polymers formed by high pressure or low pressure polymerization, and any mixtures thereof. Examples of suitable commercially available resins comprising a polyethylene-based polymer include DOW 2032G made by Dow Chemicals, EC474 made by Westlake Chemical Corporation, and M6060 made by LyondellBasell.

"Polypropylene" is understood to encompass polypropylene-based (polypropylenic) polymers such as polypropylene homopolymers and copolymers, including impact and random copolymers. One example of a suitable commercially available resin comprising a polypropylene-based polymer is Borealis BD712CF made by Borealis, Vienna, Austria.

In one particular embodiment, the polymeric composition comprises polyethylene and/or polypropylene. In another particular embodiment, the polymeric composition consists essentially of polyethylene.

Other examples of suitable polymerics include olefinic block copolymers, olefinic random copolymers, and mixtures thereof. In one embodiment, the olefinic block copolymer may be polypropylene-based, such as those sold under the trade name INFUSE® by The Dow Chemical Company of Midland, MI, VISTAMAXX® and IMPACT® Copolymers such as Exxon PD 7623 by ExxonMobil Chemical Company of Houston, TX. In one embodiment, the films comprise an ethylene-based olefinic block copolymer.

The films, or individual layers thereof, further may comprise one or more elastomeric polymers, including styrenic block copolymers, elastomeric olefinic block copolymers, or mixtures thereof. Non-limiting examples of suitable styrenic block copolymers (SBC's) include styrene-butadiene-styrene (SBS), styrene-isoprene-styrene (SIS), styrene-ethylene-butylene-styrene (SEBS), styrene-ethylene-propylene (SEP), styrene-ethylene-propylene-styrene (SEPS), or styrene-ethylene-ethylene-propylene-styrene (SEEPS) block copolymer elastomers, polystyrene, and mixtures thereof. Suitable SBC resins include KRATON® Polymers of Houston, TX; Dexco Polymers LP of Planquemine, LA; or Septon Company of America of Pasadena, TX.

The aforementioned polymers may be present in the film, or in individual layers of the film, in an amount of at least about 40%, from 0.1% to about 95%, from about 20% to about 95%, or from about 40% to about 85%. In one particular embodiment, the films or individual layers thereof comprise polypropylene in an amount of from about 0.1% to about 40%, or of from about 2% to about 25%. In another particular embodiment, the films comprise at least about 40% polypropylene. In another particular embodiment, the films or individual layers thereof comprise at least about 40% polyethylene, or alternatively from about 40% to about 60% polyethylene.

The films may be inelastic, meaning that while the films are extensible, after stretching the films do not return to substantially the same length as prior to stretching. Inelastic films of the present invention may have a permanent set of greater than 20%, and alternatively greater than 50%. Inelastic films may comprise one or more elastic polymers, though in an amount insufficient to render the film elastic. When present, the amount of elastomeric polymer may be less than 50%, less than 25%, less than 15%, less than 10%, and alternatively from about 0.1% to about 50% or from about 0.1% to about 25%, by weight of the polymeric composition. In one particular embodiment, the films or one or more individual layers of a film, are substantially free of an elastomeric polymer.

The films further may comprise a filler suitable to induce pore formation upon stretching, one example of which is calcium carbonate. The filler may be present in an amount of at least 20%, at least 30%, or from about 30% to about 60%. The filler particles may have an average particle size (diameter) of from about 0.1 microns to about 10 microns, from about 0.1 microns to about 5.0 microns, or from about 1.0 to about 2.0 microns. Additionally or alternatively, the film may comprise from about 1% to about 25% of an IR-emitting material, non-limiting examples of which include charcoal, bamboo charcoal, nepheline syenite, tourmaline, or combinations thereof.

The films further may include optional components, such as opacifiers, plasticizers, compatibilizers, draw down polymers, processing aids, anti-blocking agents, viscosity-reducing polymers, and the like. Other additives may include pigments, dyes, antioxidants, antistatic agents, slip agents, foaming agents, heat or light stabilizers, UV stabilizers, and the like. Examples of suitable processing aids are available from Ampacet Corporation (Tarrytown, NY).

The present invention further describes laminates comprising a film described herein, and a substrate attached to at least one surface of the film. The substrate may be any woven or a nonwoven material suitable for use with thermoplastic films, and in one embodiment is a spunbond nonwoven substrate. The substrate may have a basis weight of 100 gsm or less, 50 gsm or less, 25 gsm or less, 15 gsm or less, or of from about 1 gsm to about 25 gsm. The substrate may be attached to the film by a variety of means such as adhesive lamination, ultrasonic bonding, thermal point bonding, extrusion bonding, or any combinations thereof. The laminate may be both ultrasonically and adhesively bonded (e.g., ultrasonically bonded with an adhesive assist), or be solely ultrasonically bonded, in which case the laminate may comprise ultrasonic welds and be substantially free of adhesive.

Method

Figure 3:
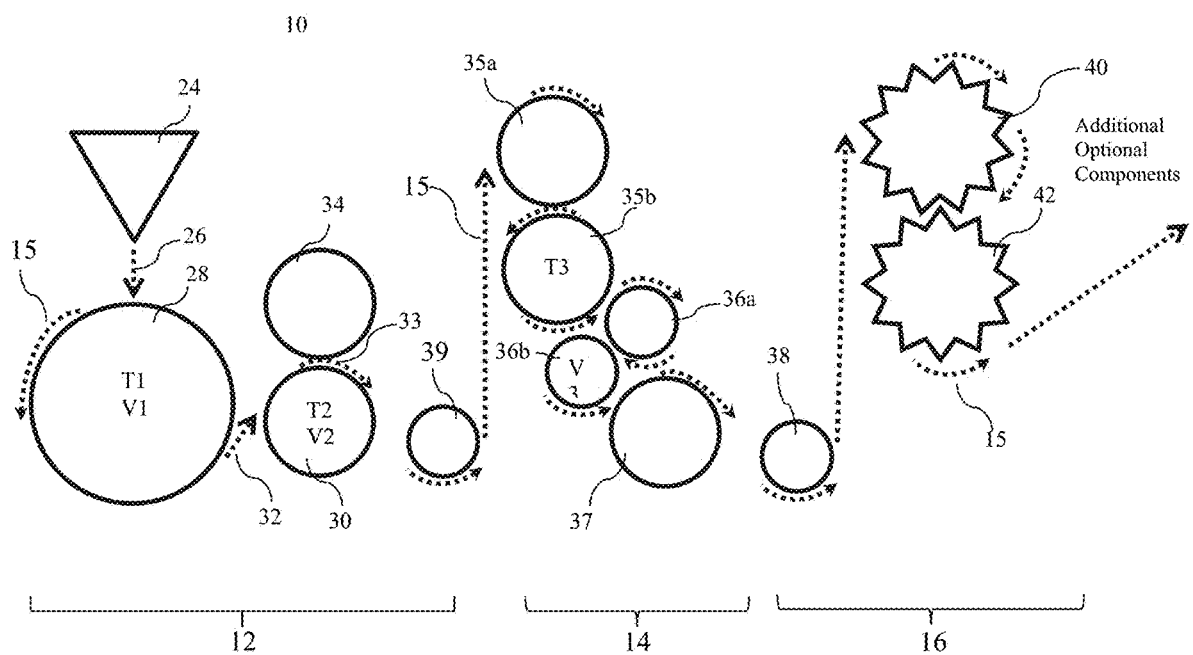
FIG. 3 is a schematic representation of one apparatus suitable for making the films of the present invention.

An apparatus suitable for making the films is described in U.S. Pat. No. 9,492,332 (Cancio et al.), "Breathable and Microporous Thin Thermoplastic Films," and depicted in FIG. 3. The apparatus (10) comprises casting/drawing section (12), machine direction orientation (MDO) section (14), and optional cross-direction interdigitated roller (CDI) section (16). Methods described therein also are suitable for producing the films of the present invention, with the exception of differences noted herein which are believed to result in the unique observed properties.

The webs, or films, may be formed by a variety of means that would be understood by one skilled in the art, and may be cast, blown, calendered, mono-extruded, co-extruded, chill cast, nip embossed, tentered, or any other method which would result in a film compatible with the process described herein.

The polymeric film formulation may be blended in an extruder, for example at a temperature of from about 210° C. to about 280° C. The exact temperature will depend upon the formulation of the polymeric compositions. The web, or "melt curtain," comprising the polymeric composition may be extruded (or coextruded if a multilayer film is being formed) from an extruder (24) across a first gap (26) onto an embossed, or chill, roller (28) to form a film (15), which is further advanced to a stretching roller (30) across a second gap (32). Stretching roller (30) forms a nip (33) with additional roller (34).

The temperature of the chill roller (28) is carefully controlled so that the film, as it leaves the chill roller (28), is at a temperature sufficiently high that it can be stretched to the desired thickness, yet below the melting temperature of the polymeric composition. Thus, the temperatures are dependent upon the composition of the film, however, in contrast to the method described in U.S. Pat. No. 9,492,332, for the films described herein T1 is about 40° C. or less, and T2 is approximately equal to or less than T1.

The length of first gap (26) is the shortest distance between the extruder (24) and the chill roller (28). The length of the second gap (32) between the chill roller (28) and the nip (33) at the stretching roller (30) and additional roller (34) is the shortest distance between the chill roller (28) and the stretching roller (30). In contrast to the method described in U.S. Pat. No. 9,492,332, the second gap (32) has a length of less than 1 inch, and alternatively less than 0.1 inch.

The ratio of the velocities of the rolls V2/V1 determines the amount of MD stretching. Thus, a ratio 1/1 (1×) indicates the film has not been stretched. A ratio of 5/1 (5×) indicates a film has been stretched 5 times the original length before stretching, with a corresponding reduction in film thickness, i.e. 0.2 times its thickness prior to stretching. Herein, the ratio of V2/V1 is from about 1 to about 2.

Downstream from casting/drawing section (12), the film (15) may pass from stretching roller (30) around idle roller (39) to a first MDO section (14). MDO section (14) may include heated rollers (35a) and (35b), maintained at temperature T3, followed by stretching rollers (36a) and (36b) and cooling and/or annealing roller (37), maintained at a temperature T4. Further in contrast to the method described in U.S. Pat. No. 9,492,332, T3 is from about 70° C. to about 110° C., and the films may or may not have comparable MD and CD orientation.

The cross-direction interdigitated roller (CDI) section may include a tensioning roller (38) followed by interdigitating rollers (40, 42). In the present invention, interdigitating rollers may be used to stretch the film in the cross direction, resulting in additional film activation and breathability. In one embodiment, machine direction interdigitating rollers are used in place of, or in addition to, cross direction interdigitating rollers, either before or after the CDI section. Suitable cross direction interdigitated rollers are described, e.g., in U.S. Pat. No. 7,442,332.

The film may move from the CDI section (16) to other components, including but not limited to, a corona treatment section, an annealing section, a second MDO section, and/or a winder, where it is then ready for its intended use.

The films and/or laminates are useful for a variety of purposes, including for example use in articles such as personal hygiene products, such as absorbent articles. Non-limiting examples include diapers, training pants, adult incontinence pads and pants, swimwear, sanitary napkins, tampons, pantiliners, and/or as absorbent pads or breathable shields to protect clothing from fluids, such as perspiration in specific areas of the body. Therefore, one aspect of the present invention is an absorbent article comprising the films and/or laminates described herein, and in one particular aspect is a diaper. In one aspect, the films and/or laminates form a portion of an absorbent article, such as a diaper backsheet, ear (closure tabs), waistband, side panel, legcuff, and/or packaging such as a pouch or outer wrapper. Other uses include as wrappers for foods, breathable bags, and building applications, such as roofing and wall linings, and backsheets for flooring and carpeting.

Test Methods

Hydrohead Pressure

The hydrohead pressure may be measured according to the method described in AATCC 127-2008, subject to the modification described herein. Specifically, a Textest Instrument FX 3000 Hydrotester III, 05/07 s/n 597 or higher may be used. The standard test gradient is 60 mbar/min. One surface of the test specimen (facing downward) is subjected to water applied under hydrostatic pressure. The pressure is increased at a constant rate, until three points of leakage appear on its opposite surface (facing upwards). This method is modified by placing a 70 gsm spunbond polypropylene nonwoven support (one suitable example of which is available from Radici Group) on top of the opposite surface (facing upwards) of the test specimen to prevent the test specimen from distorting under pressure. The test endpoint is the third drop, and the pressure in mbar is recorded when the first, second and third drops penetrate the sample and/or the pressure when the sample bursts. If no water penetration is observed, the maximum test pressure is recorded. The hydrohead pressure was the average of five measurements (n=5) of the same film.

Cup crush peak load may be measured according to the method described in WSP 402.0(09), with the following details. A 9"×9" laminate sample is shaped inside a forming cup. The forming cup and sample are then placed on a base plate that is mounted on a tensile tester. A hemispherical-shaped (Mushroom) foot attached to a 50 N load cell is lowered into the middle of the forming cup to "crush" the sample. The cross head speed is 405 mm/min±5 mm/min. The plunger travel distance is 65 mm. Peak load and energy are measured and plotted over a time period of about 62 minutes in units of gf, where "g" means grams and "f" means the force of acceleration due to gravity.

EXAMPLES

Films are formed according to the method described herein, with the following additional parameters. Polymeric films of samples 1-11 have the following composition, with all percentages indicated by weight of the composition: 57% polyethylene, 38% calcium carbonate, and 5% processing aids. Coextruded multilayer films having an ABA construction are made as follows: The A layers each comprise 57% polyethylene, 38% calcium carbonate, and 5% processing aids, and have a thickness of about 7 gsm. The B layer comprises 52% polyethylene, 10% polypropylene and 38% calcium carbonate, and has a thickness of about 4 gsm (data not shown). Breathability was measured as described herein, with a total of eighteen measurements obtained over the cross-direction (width) of the film. Comparative examples (samples 1-4) are made using an apparatus and process as described, e.g., in U.S. Pat. No. 9,492,332. Whereas samples 1-3 exhibit acceptable hydrohead pressures, they do not have the desired breathability. Furthermore, as the breathability is increased, the hydrohead pressure either stays relatively the same, or decreases significantly (sample 4). Working examples 5-11 are made with an apparatus similar to that depicted in FIG. 3 and using the parameters described herein, including the following: A metal chill roller was used at a temperature T1 of about 40° C.; T2 was approximately equal to T1, V2/V1 was about 1.75, and gap 2 (32) was about 0.1". All films exhibited the claimed combination of breathability and hydrostatic head pressure. Furthermore, when films of similar basis weight are compared (for the purposes of this comparison), the hydrohead pressure generally increases with increased breathability. The characteristics of the films are summarized in Table 1. The films are adhesively and/or ultrasonically bonded to a substrate, and used to form the backsheet of a diaper and other absorbent articles.

TABLE 1

| Sample Nr. | Cup Crush (gf) | Basis Wt. (gsm) | CD load at 10% (g/in) | MD load at 10% (g/in) | F50 Impact (Impact Strength) (g) | Un-notched Elmendorf tear strength - MD (g) | Un-notched Elmendorf tear strength - CD (g) | Avg. WVTR | Hydrohead (mbar) |
|---|---|---|---|---|---|---|---|---|---|
| 1 | 402 | 19 | 374 | 585 | 51 | 269 | 362 | 10,752 | 396 |
| 2 | 483 | 19 | 342 | 886 | 44 | 107 | 309 | 14,162 | 379 |
| 3 | 463 | 19 | 379 | 673 | 51 | 352 | 408 | 13,951 | 396 |
| 4 | 495 | 19 | 330 | 620 | 50 | 133 | 259 | 15,085 | 256 |
| 5 | 81 | 8 | 157 | 356 | 81 | 182 | 129 | 19,766 | 303 |
| 6 | 299 | 14 | 206 | 626 | 54 | 16 | 368 | 22,288 | 525 |
| 7 | 528 | 19 | 346 | 924 | 49 | 56 | 267 | 16,816 | 390 |
| 8 | 547 | 19 | 372 | 1077 | 47 | 40 | 168 | 19,755 | 416 |
| 9 | 527 | 19 | 351 | 922 | 47 | 43 | 181 | 19,862 | 440 |
| 10 | 658 | 18 | 303 | 1267 | 68 | 19 | 181 | 19,976 | 623 |
| 11 | 1359 | 32 | 595 | 1273 | 72 | 186 | 512 | 16,547 | 593 |

FIG. 1 depicts a graph showing the relationship of breathability (WVTR in g/m2/day) and leakage (hydrohead in millibar) of representative films of the present invention. All films had a composition similar to samples 1-11 in Table 1, and a basis weight of about 18 gsm. As the breathability increases (x-axis) from about 17,000 WVTR to nearly 24,000 WVTR, a corresponding increase in hydrohead pressure (i.e., decrease in leakage) is seen (y-axis). This data show that despite having a higher breathability, the leakage of the films actually decreases.

Figure 2:
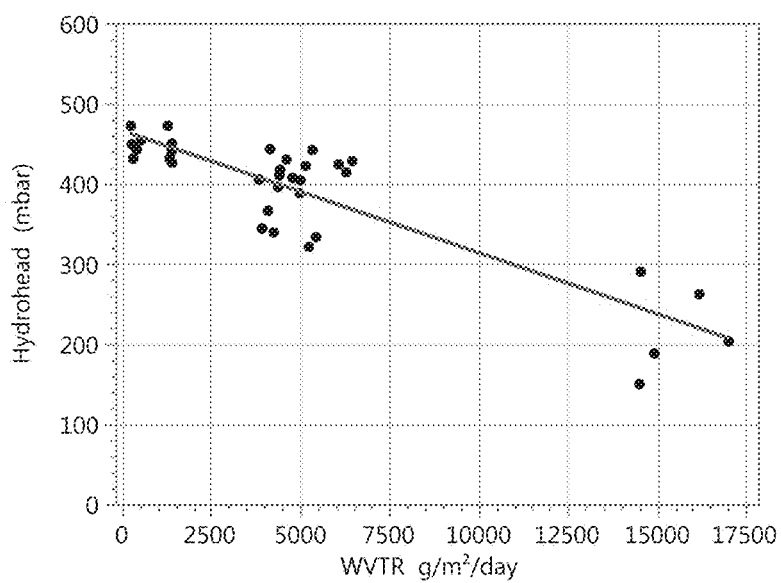
FIG. 2 depicts a graph showing the relationship of breathability to hydrostatic head pressure of representative, commercially-available films in the prior art. The y-axis shows hydrostatic head pressure in mbar, and the x-axis shows breathability (WVTR) in units of g $H_2O$/24 hours/$m^2$ (g/sm/day).

In contrast, FIG. 2 shows the same measurements of WVTR and hydrohead obtained from commercially available films of the prior art. The films had a composition similar to samples 1-11 in Table 1 and a basis weight of about 18 gsm, and were not made by the process described herein. The data correlate with what would typically be expected in such films, namely, that as the breathability increases, the leakage increases as well, as shown by the decreasing hydrohead pressures.

In all embodiments of the present invention, all ranges are inclusive and combinable. All numerical amounts are understood to be modified by the word "about" unless otherwise specifically indicated. To the extent that the terms "includes," "including," "contains," or "containing" are used in the specification or the claims, they are intended to be inclusive in a manner similar to the term "comprising" as that term is interpreted when employed as a transitional word in a claim.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Whereas particular embodiments of the present invention have been illustrated and described, it would be obvious to those skilled in the art that various other changes and modifications can be made without departing from the spirit and scope of the invention. It is therefore intended to cover in the present claims all such changes and modifications that are within the scope of this invention.

What is claimed is:

1. A microporous film comprising a polymeric composition and a filler, wherein the film has an average water vapor transmission rate of at least about 20,000 grams $H_2O$/24-hour/$m^2$, a hydrostatic head pressure of at least about 300 mbar, and a basis weight of from about 5 gsm to about 50 gsm, and
    wherein the polymeric composition comprises less than 50% elastomeric polymer.

2. The film of claim 1, wherein the polymeric composition comprises polyethylene, polypropylene, or mixtures thereof.

3. The film of claim 1, wherein the filler comprises calcium carbonate.

4. The film of claim 1, wherein the film has at least one of a machine-direction load at 10% strain of at least about 350 g/in or a cross-direction load at 10% strain of at least about 150 g/in.

5. The film of claim 1, wherein the film has an impact strength of at least 40 g.

6. The film of claim 1, wherein at least one surface of the film is printed with at least one ink.

7. The film of claim 1, wherein the film is embossed.

8. The film of claim 1, wherein the film is bonded to at least one substrate to form a laminate.

9. The laminate of claim 8, wherein the film is bonded to the substrate with an adhesive.

10. The laminate of claim 8, wherein the film is ultrasonically bonded to the substrate.

11. The laminate of claim 10, wherein the laminate is substantially free of adhesive.

12. A multilayer microporous film comprising a polymeric composition and a filler, wherein the multilayer film has an average water vapor transmission rate of at least about 16,000 grams $H_2O$/24-hour/$m^2$, a hydrostatic head pressure of at least about 300 mbar, and a basis weight of from about 5 gsm to about 50 gsm, and
  wherein the multilayer film has three layers in an ABA arrangement, the A layers comprise polyethylene and calcium carbonate and the B layer comprises polyethylene, polypropylene, and calcium carbonate.

13. The multilayer film of claim 12, wherein each of the A layers comprises at least 40% polyethylene.

14. The multilayer film of claim 13, wherein each of the A layers comprises at least 20% calcium carbonate.

15. An article comprising a microporous film comprising a polymeric composition and a filler, wherein the film has an average water vapor transmission rate of at least about 16,000 grams $H_2O$/24-hour/$m^2$, a hydrostatic head pressure of at least about 300 mbar, and a basis weight of from about 5 gsm to about 50 gsm, and
  wherein the polymeric composition comprises less than 50% elastomeric polymer and
  wherein the polymeric composition comprises at least 30% filler.

16. The article of claim 15, wherein the film is bonded to at least one substrate to form a laminate.

17. The article of claim 16, wherein the film is bonded to the substrate with an adhesive.

18. The article of claim 16, wherein the film is ultrasonically bonded to the substrate.

19. The article of claim 18, wherein the laminate is substantially free of adhesive.

20. The article of claim 15, wherein the article is a diaper, a feminine care product, packaging, or any combinations thereof.

\* \* \* \* \*